(12) United States Patent  
Stull et al.

(10) Patent No.: US 8,440,913 B2  
(45) Date of Patent: May 14, 2013

(54) BREAKER WITH IMPROVED SHIPPING CONFIGURATION

(75) Inventors: Jason Stull, Mount Pleasant, PA (US); Vince Rogers, Del Mar, CA (US); Christian Daehler, Greensburg, PA (US)

(73) Assignee: ABB Technology AG, Zurich (CH)

( * ) Notice: Subject to any disclaimer, the term of this patent is extended or adjusted under 35 U.S.C. 154(b) by 443 days.

(21) Appl. No.: 12/761,430

(22) Filed: Apr. 16, 2010

(65) Prior Publication Data

US 2010/0270056 A1 Oct. 28, 2010

Related U.S. Application Data

(60) Provisional application No. 61/172,560, filed on Apr. 24, 2009.

(51) Int. Cl.
*H01B 17/16* (2006.01)
*H01H 33/00* (2006.01)

(52) U.S. Cl.
USPC ...... 174/161 R; 174/163 R; 218/97; 218/134; 218/139; 218/155

(58) Field of Classification Search .............. 174/161 R, 174/163 R; 218/97, 134, 139, 155
See application file for complete search history.

(56) References Cited

U.S. PATENT DOCUMENTS

| 1,138,702 | A | * | 5/1915 | Varney ...................... 174/161 R |
|---|---|---|---|---|
| 2,506,178 | A | * | 5/1950 | Shaw .............................. 244/50 |
| 2,779,091 | A | * | 1/1957 | Harwood ........................ 269/85 |
| 3,073,891 | A | * | 1/1963 | Barengoltz ............... 174/161 R |
| 5,005,862 | A | * | 4/1991 | Yamaguchi .................. 280/775 |
| 5,128,502 | A | * | 7/1992 | Hux .............................. 218/153 |
| 5,409,261 | A | * | 4/1995 | Yamaguchi .................. 280/775 |
| 5,569,891 | A | * | 10/1996 | Freeman et al. ............ 200/17 R |
| 5,576,523 | A | * | 11/1996 | Meyer ........................ 200/17 R |
| 7,915,558 | B2 | * | 3/2011 | Nelson et al. ................ 218/155 |
| 2005/0077695 | A1 | * | 4/2005 | Sherer et al. ................ 280/79.5 |
| 2007/0080144 | A1 | * | 4/2007 | Meyer et al. .................. 218/97 |
| 2008/0257865 | A1 | | 10/2008 | Yoshitomo et al. |
| 2008/0283214 | A1 | * | 11/2008 | Starkey et al. ................. 165/41 |
| 2009/0045892 | A1 | | 2/2009 | Nelson et al. |
| 2009/0284963 | A1 | * | 11/2009 | Intravatola .................... 362/190 |

* cited by examiner

*Primary Examiner* — Timothy Thompson
*Assistant Examiner* — Nathan Milakovich
(74) *Attorney, Agent, or Firm* — Michael Charles Prewitt; Denis Ticak

(57) ABSTRACT

A pole assembly for a three phase breaker includes a center pole and a pair of outer poles positioned on opposed sides of the center pole. A pair of brackets are positioned at opposed ends of the pole, and include a center groove and a pair of outer grooves. The center pole is positioned in the center groove. The outer poles are secured in the outer groove in a shipping configuration and an installed configuration. When in the shipping configuration the bushings of all the poles are parallel. When in the installed configuration the bushings of the outer poles are angled away from the bushings of the center pole.

7 Claims, 11 Drawing Sheets

BREAKER WITH IMPROVED SHIPPING CONFIGURATION

This application claims priority to U.S. Provisional Application Ser. No. 61/172,560 titled Breaker with Improved Shipping Configuration and filed on Apr. 24, 2009, the contents of which are hereby incorporated by reference in their entirety.

BACKGROUND

Gas insulated high voltage circuit breakers are commonly located in electrical distribution sub-stations and selectively open and close electrical connections therein. One such prior art circuit breaker is the three-pole circuit breaker 10 shown in FIGS. 1-3. The high voltage circuit breaker 10 includes three poles 12. Each pole 12 includes a tank 14, a pair of outwardly extending bushings 16, and current transformers 18 proximate to the intersection of each bushing 16 and tank 14.

The poles 12 are mounted to a pair of support brackets 20 positioned at opposing ends of the poles 12. Support brackets 20 are coupled to a frame 22 having a plurality of interconnected metal linkages. Frame 22 is also coupled to an operating device 24 that includes a protective cabinet 26 that houses the operating electronics as well as the breaker actuating mechanism. As is well known in the art, the operating electronics may (either by sensing a fault or when receiving a control command from an exterior source) command the actuating mechanism to move an actuating rod 28, which causes the breakers to open or close.

Circuit breakers 10 are relatively large assemblies, and thus shipping costs are a non-trivial portion of the overall cost of the breaker. In order to reduce these costs, breakers 10 are commonly shipped disassembled, so that smaller shipping containers may be used. This is facilitated by, for example, removing the frame 22 and operating device 24 from the subassembly including the poles 12 and support brackets 20. Frame 22 may be further disassembled into the constituent metal linkages.

Regarding the pole/bracket subassembly, the overall size was reduced for shipping by placing the poles 12 in a shipping configuration (See FIG. 3) which occupies a smaller area than the installed configuration (See FIG. 2). In the installed configuration, the bushings 16b of the center pole 12b extend substantially perpendicular to the ground (when viewed from the front). For purposes of electrical isolation of the phases, the bushings 16a,c of the two outer poles 12a,c are angled away from the bushings 16b of the center pole 12b. Each pole is fixed to support bracket 20 positioned at each end of the poles 12. The poles 12 are secured to support bracket 20 by three bolts at each end.

With reference to FIG. 3, when in the shipping configuration, the outside poles 12a,c are pivoted inwardly toward center pole 12b, such that all three bushings 16 are parallel with each other and perpendicular to the ground (when viewed from the front). This was accomplished by removing the outer two bolts 30 on each end and then pivoting the pole 12 about the remaining, inner bolt 32. Once aligned in the shipping configuration, a shipping bracket 34 is bolted to both the support bracket 20 and poles 12a,c to retain the outer poles 12a,c in the shipping configuration. When the installation site is reached, the shipping brackets 34 were removed, allowing the outer poles to pivot outwardly and be secured in the installed position.

The above described method and configuration does enable the use of smaller shipping containers and the corresponding reduction in shipping costs. However, drawbacks remain. For example the outer bushings 16a,c extend higher than center bushing 16b, thereby adding to the shipping container size. Further, the act of pivoting the pole can be difficult and cumbersome.

Thus, there is a need in the art for a high voltage breaker assembly that is optimized to reduce the costs of shipping and the labor involved in on-site assembly.

SUMMARY OF THE INVENTION

According to one aspect of the present invention a pole assembly is provided for a three phase breaker. The pole assembly includes a center pole and a pair of outer poles positioned on opposed sides of the center pole. Each pole includes a pair of outwardly extending bushings. A pair of brackets positioned at opposed ends of the poles, and include a center groove and a pair of outer grooves located on opposed sides of the center groove. The center pole is positioned in the center groove, and each outer pole is securable in an outer groove in a shipping configuration and an installed configuration. When in the shipping configuration the bushings of all the poles are parallel. When in the installed configuration the bushings of the outer poles are angled away from the bushings of the center pole. Each outer pole is pivoted about a pivot point between the shipping configuration and the installed configuration. The center of gravity of the outer pole is on a first side of the pivot point when in the shipping configuration on a second side of the pivot point, opposed from said first side, when in the installed configuration.

According to another aspect of the present invention, a pole assembly is provided for a three phase breaker. The pole assembly includes a center pole and a pair of outer poles positioned on opposed sides of the center pole. Each pole includes a pair of outwardly extending bushings. A pair of brackets positioned at opposed ends of the poles, and include a center groove and a pair of outer grooves located on opposed sides of the center groove. The center pole is positioned in the center groove, and each outer pole is securable in an outer groove in a shipping configuration and an installed configuration. When in the shipping configuration the bushings of all the poles are parallel. When in the installed configuration the bushings of the outer poles are angled away from the bushings of the center pole. The outer groove includes a first arced section and a second arced section, and the outer poles are positioned in the first arced section when in the shipping configuration and in the second arced section when in the installed configuration.

DETAILED DESCRIPTION OF THE INVENTION

Figure 1:
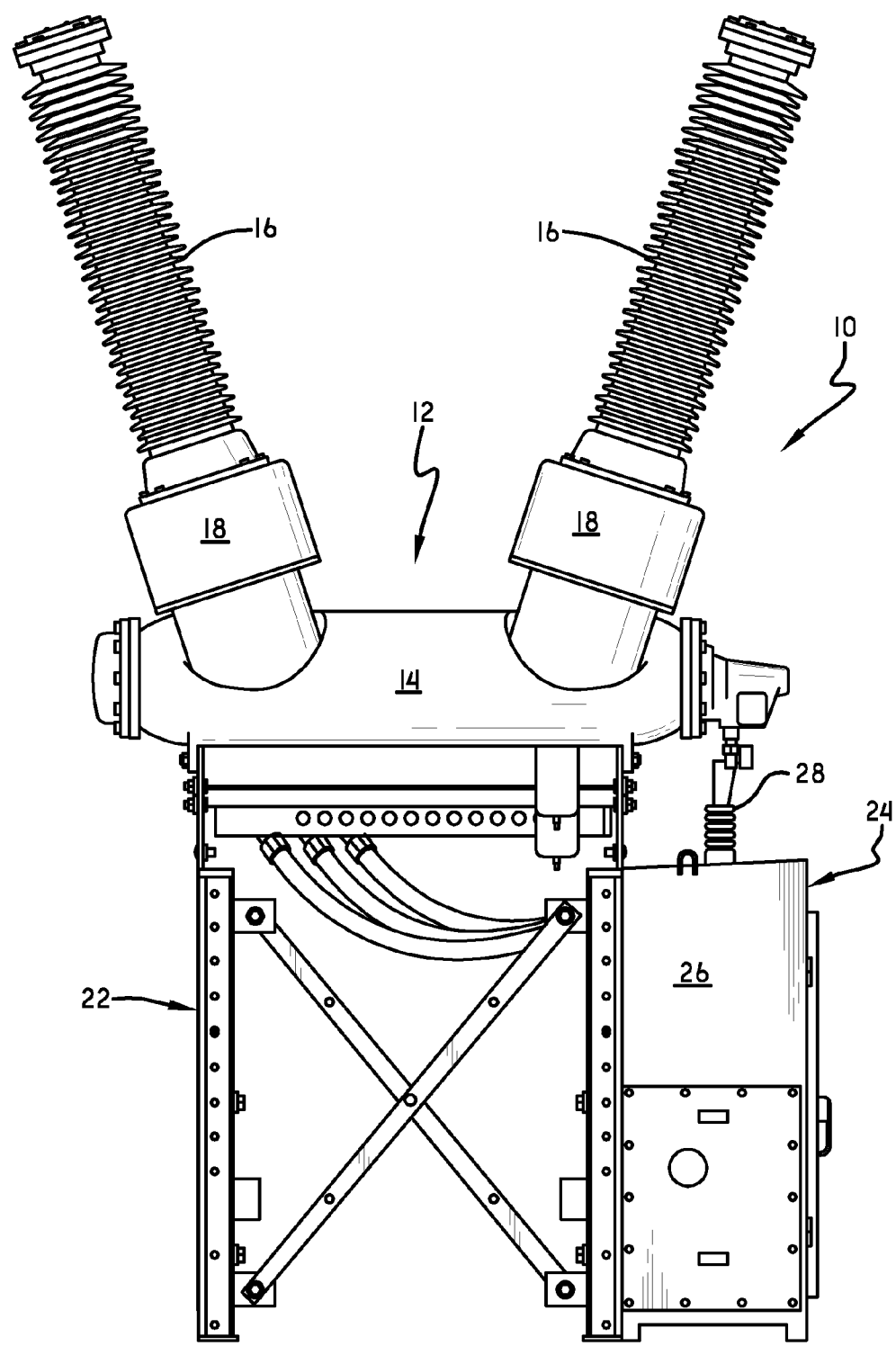
FIG. 1 is a side view of a prior art circuit breaker.
Figure 2:
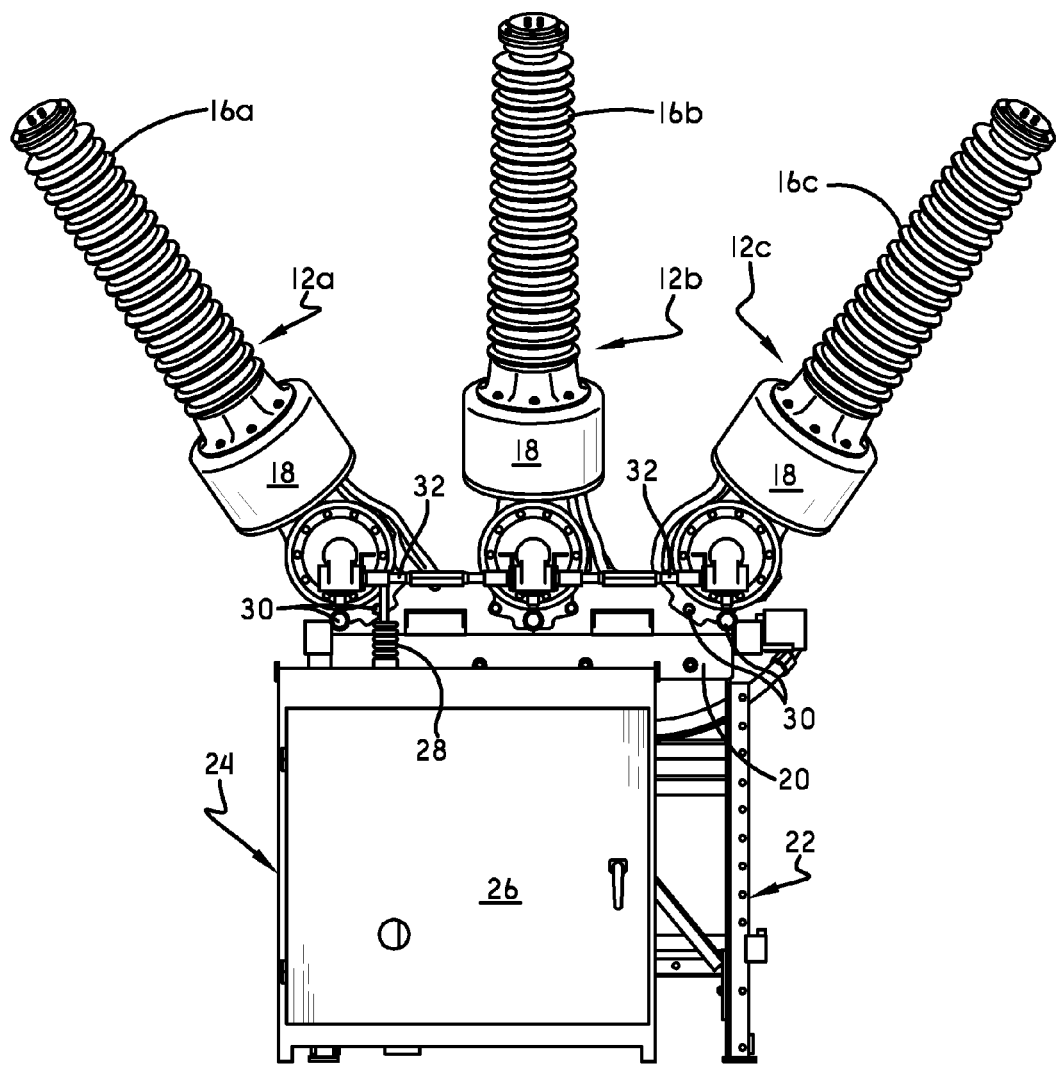
FIG. 2 is a front view of a prior art circuit breaker in an installed configuration.
Figure 3:
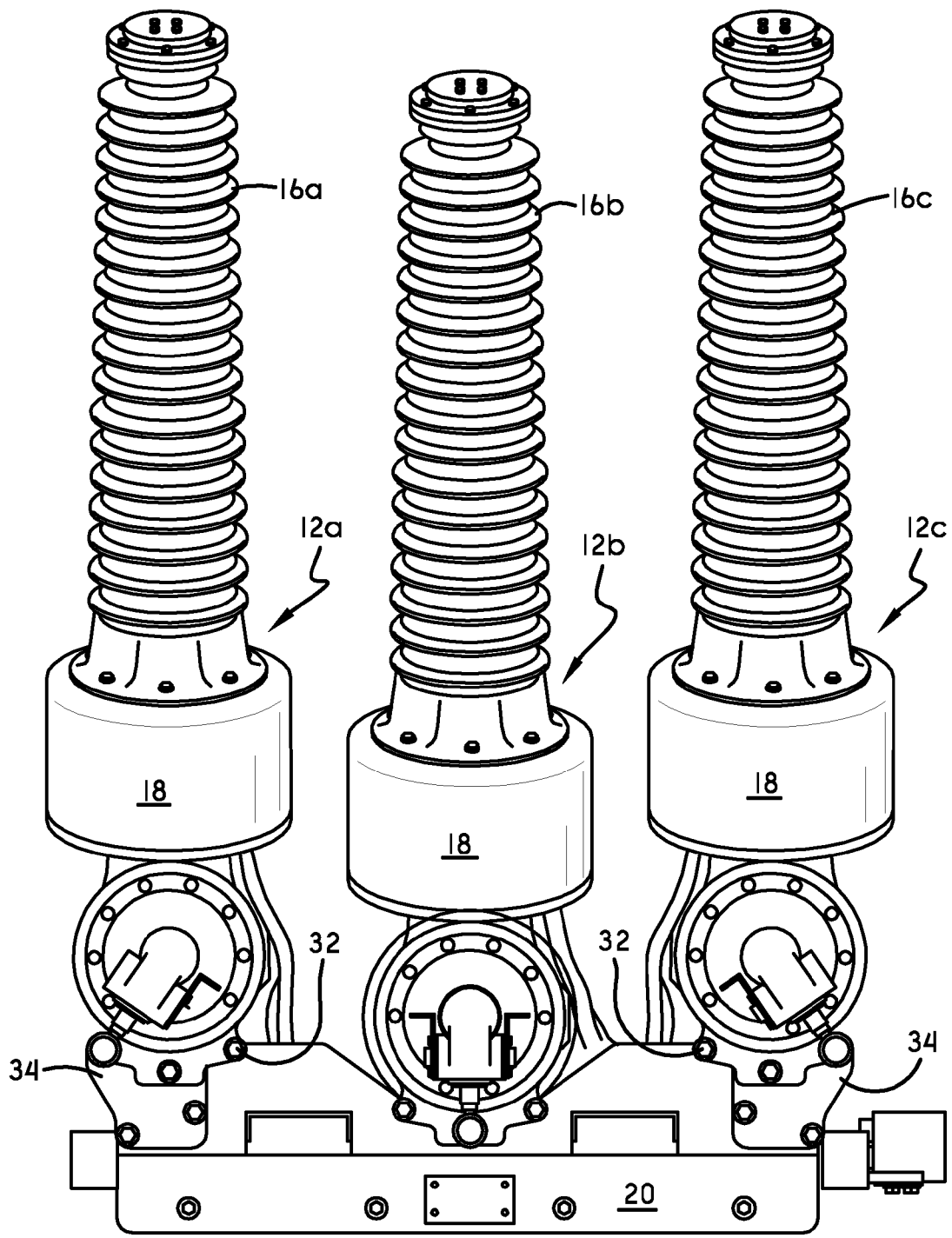
FIG. 3 is a front view of a prior art circuit breaker pole assembly in a shipping configuration.
Figure 4:
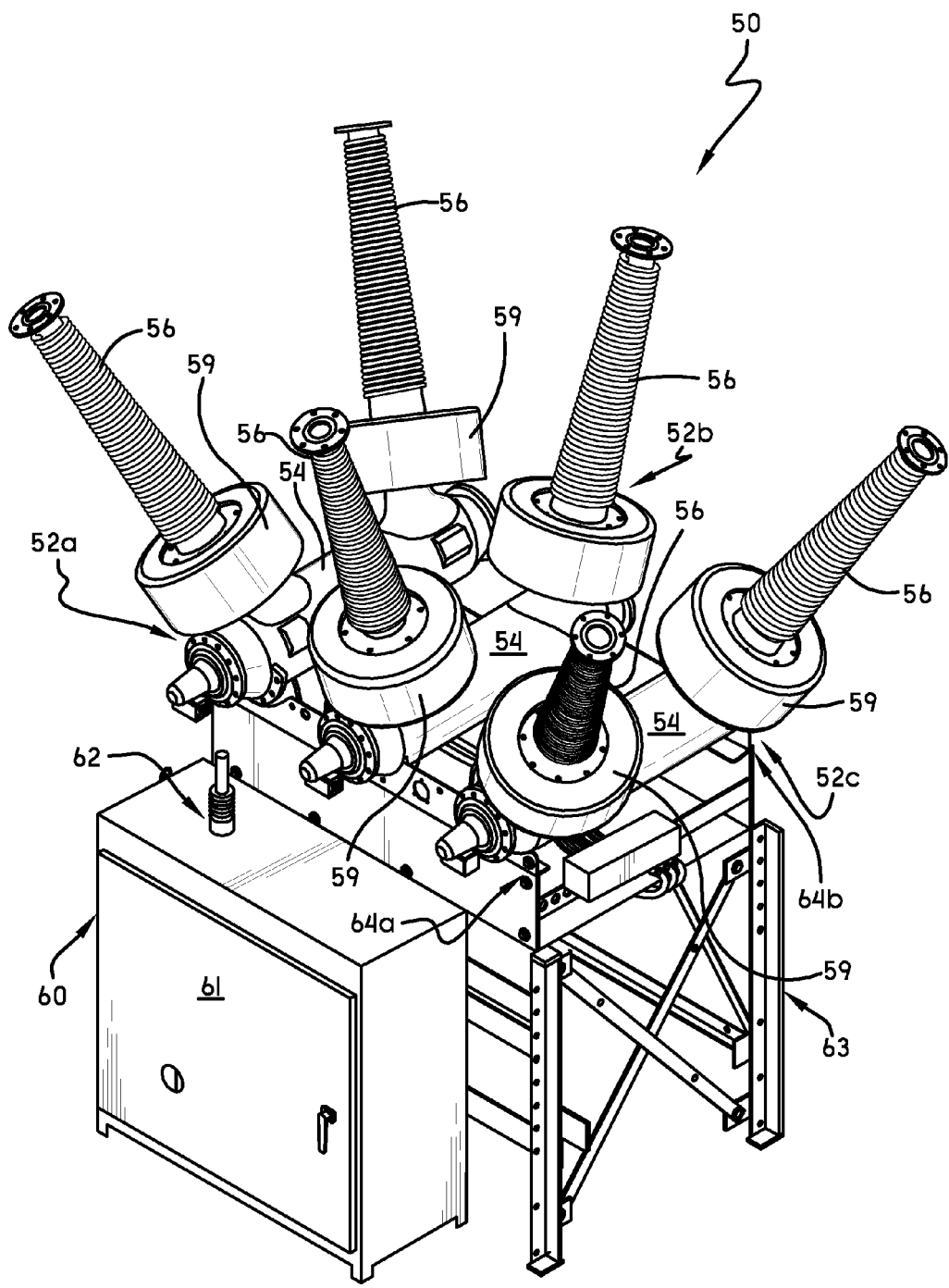
FIG. 4 is an isometric view of a circuit breaker according to the present invention and in an installed configuration.
Figure 5:
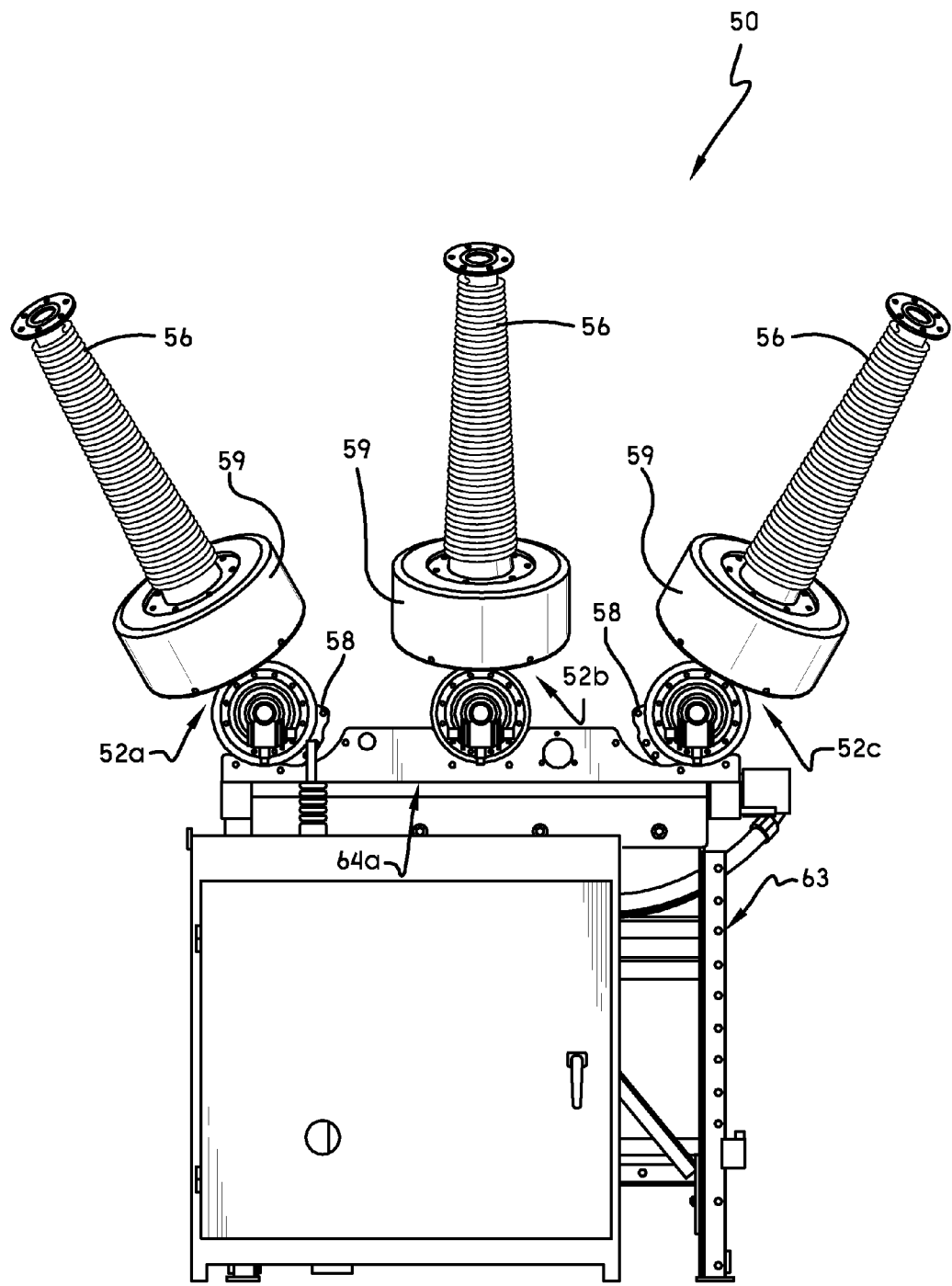
FIG. 5 is a front view of the circuit breaker according to the present invention in the installed configuration.

With reference now to FIGS. 4 and 5, a breaker according to the present invention is shown and generally indicated by the numeral 50. Breaker 50 includes a center pole 52b and a pair of outer poles 52a and 52c on opposed sides of center pole 52b. Each of the poles 52 includes a main cylindrical tank body 54, a pair of outwardly extending bushings 56, and current transformers 59 proximate to the intersection of each bushing 56 and tank 54. As is known in the art, each pole 52 includes mechanisms to selectively open or close the electrical connection between electrical conductors in the bushings 56.

A mounting flange 58 is positioned proximate to each end of tank 54. According to one embodiment, mounting flanges 58 extend approximately ⅓ the circumference of the bottom of tank 54. Each mounting flange 58 includes a plurality of circumferentially spaced holes. As will be discussed later in greater detail, one or more of the mounting flange holes are aligned with corresponding holes in a support bracket 64. The aligned holes receive bolts that couple the poles 52 to the support brackets 64.

The poles 52 are mounted to support brackets 58 positioned at opposing ends of the poles 52. Support brackets 58 are coupled to a frame 63 having a plurality of interconnected metal linkages. Frame 63 is also coupled to an operating device 60 that includes a protective cabinet 61 that houses the operating electronics as well as the breaker actuating mechanism. As is well known in the art, the operating electronics may (either by sensing a fault, receiving a control command from an exterior source, or some other means) command the actuating mechanism to move an actuating rod 62, which causes the breakers to open or close.

Figure 8:
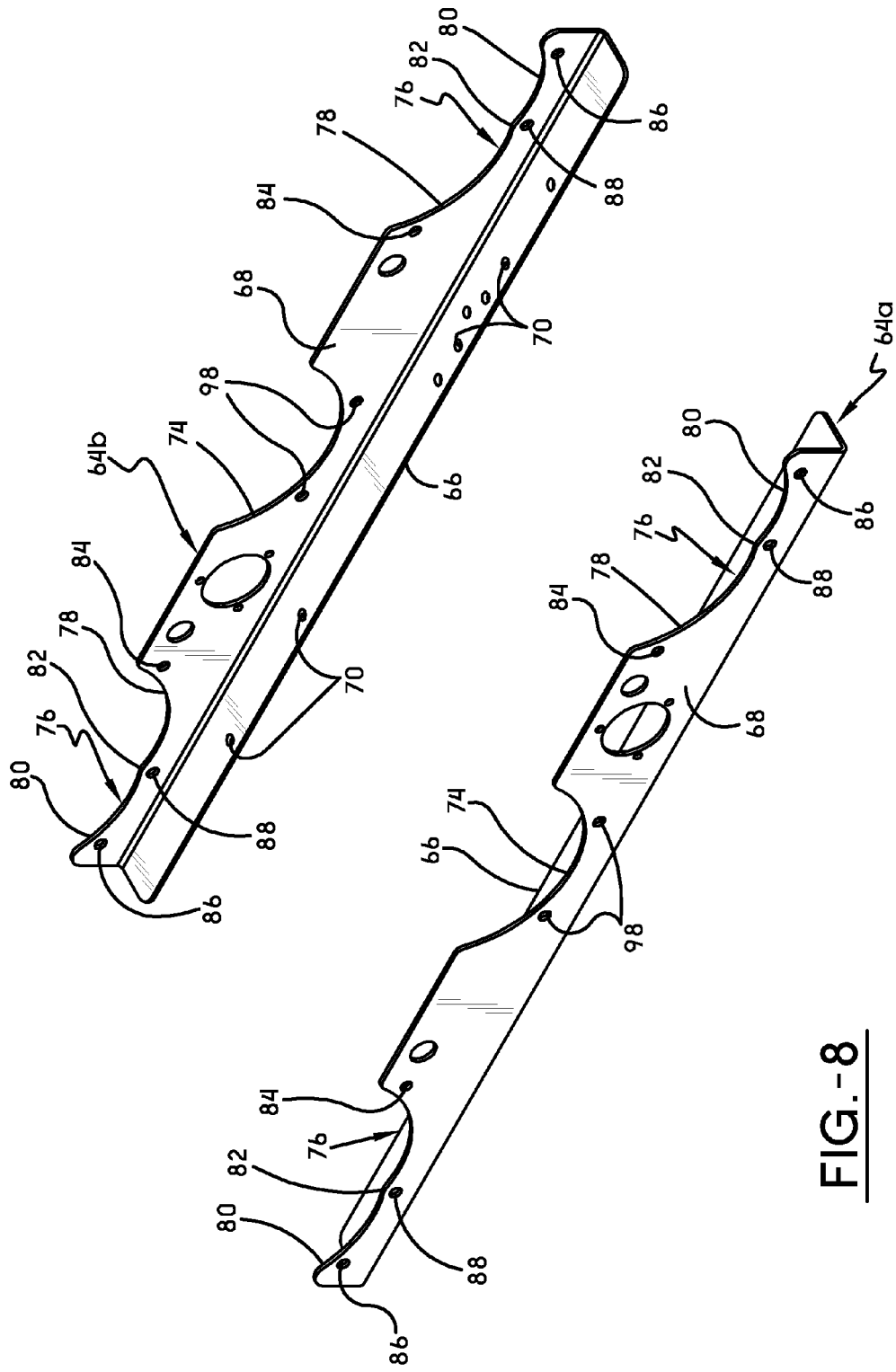
FIG. 8 is an isometric view of the support brackets according to the present invention.
Figure 9:
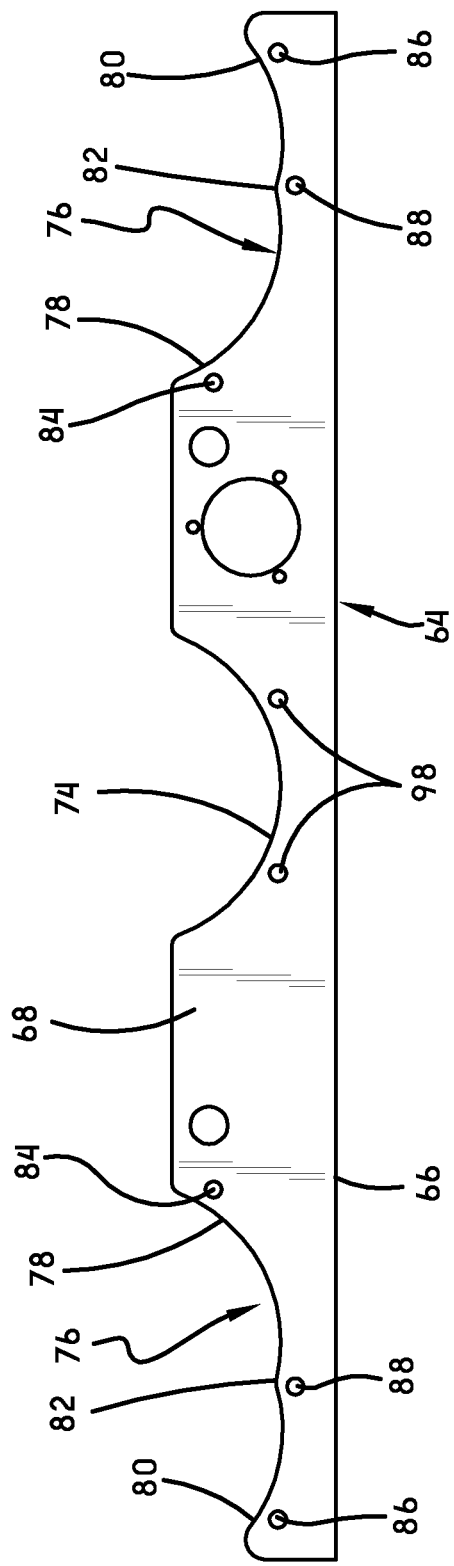
FIG. 9 is a front view of the support brackets according to the present invention.

Support brackets 64 extend transverse to the longitudinal axis of tanks 54. First support bracket 64a is positioned proximate to a first end of tanks 54 and second support bracket 64b is positioned proximate to the opposed end of tanks 54. Support brackets 64a and 64b are essentially mirrored parts and thus include substantially the same features. With reference to FIGS. 8 and 9, support brackets 64 are generally L-shaped in cross-section and have a frame mounting surface 66 and a pole mounting surface 68 at a generally 90 degree angle therefrom.

Frame mounting surface 68 includes a plurality of holes 70 which are provided to mount support brackets 64 to frame 59. Pole mounting surface 68 includes a center groove 74 that is located generally at the longitudinal center of support bracket 64. Center groove 74 is semi-circular and is shaped to match the tubular outer circumference of main tank body 54b, which is received therein. Pole mounting surface 68 further includes two outer grooves 76, one positioned proximate to each longitudinal end of support bracket 64. Outer grooves 76 are formed from a pair of intersecting arced or semicircular segments. A first arced segment 78 is positioned longitudinally inwardly from a second arced segment 80. Segments 78 and 80 meet at an intersection point 82.

As discussed above, frame mounting surface 68 includes a plurality of bolt holes that are provided to selectively align with bolt holes on mounting flange 58. Specifically, proximate too, and just below each outer groove 76, a longitudinally inner hole 84 is positioned proximate to the end of first arced segment 78 opposed from intersection point 82. A longitudinally outer hole 86 is positioned proximate to the end of second arced segment 80 opposed from intersection point 82. A pivot hole 88 is located between inner and outer holes 84 and 86 proximate to intersection point 82.

Figure 6:
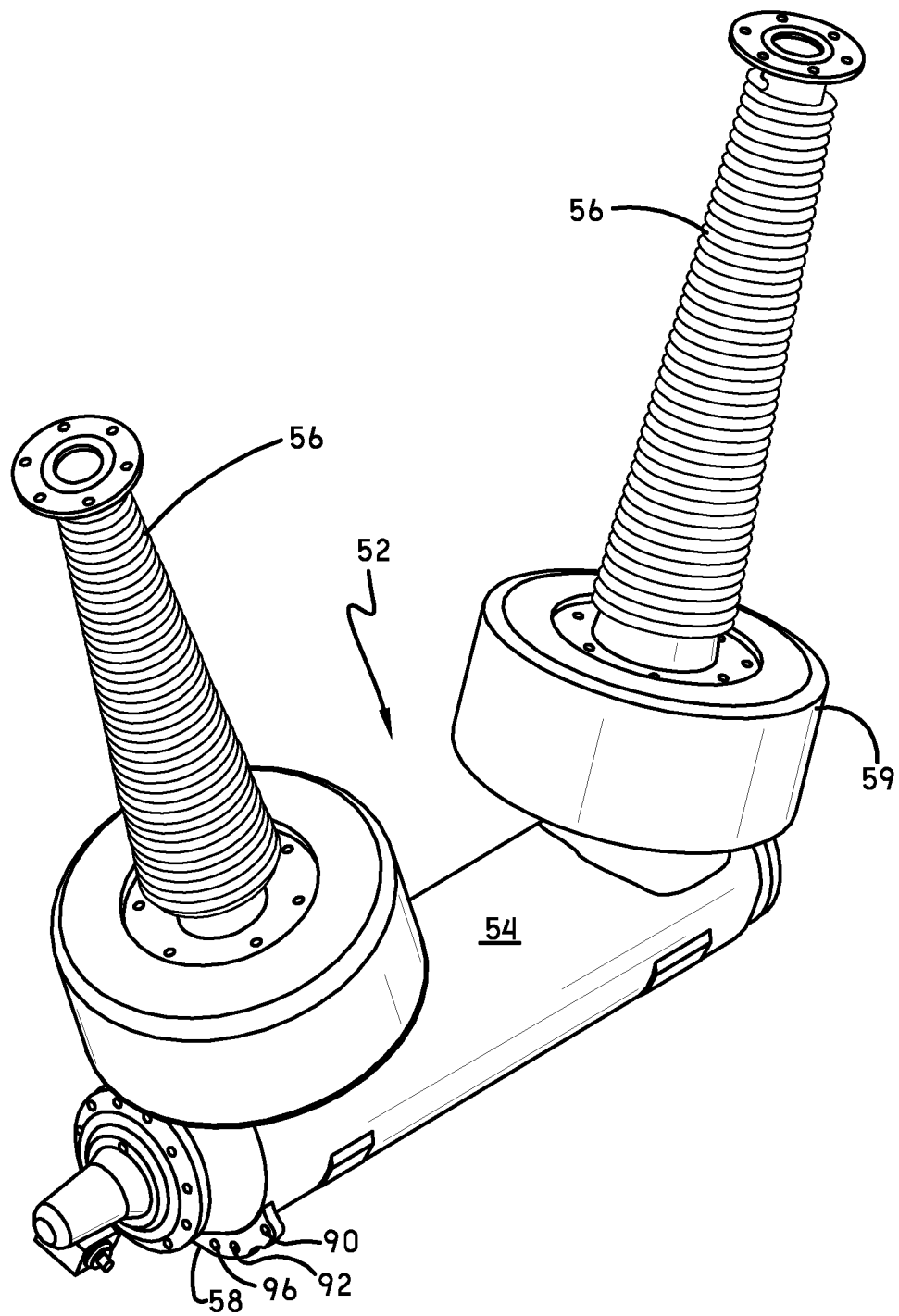
FIG. 6 in an isometric view of a single pole assembly according to the present invention.
Figure 7:
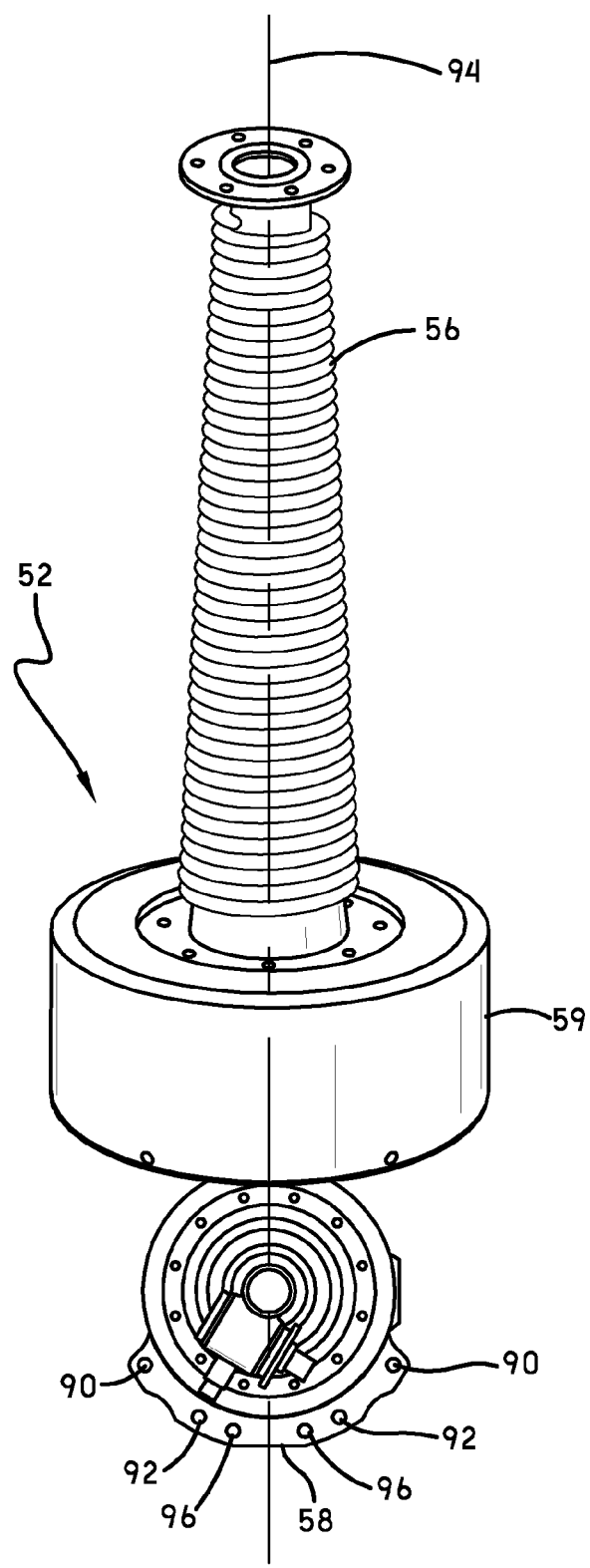
FIG. 7 is a front view of a single pole assembly according to the present invention.

With reference again to FIGS. 6 and 7, mounting flanges 58 each include a hole pattern that is suitable for mounting in either the center groove 74 or outer grooves 76, though different bolt holes are used depending on which location and orientation the pole 52 is installed. Mounting flange 58 includes a flange end hole 90 located proximate to each end of flange 58. A first pair of interior holes 92 are equally spaced from an axis 94 defined by the longitudinal axis of bushings 56 (when viewed from the front of breaker 50). A second pair of interior holes 96 are also equally spaced from axis 94 and are positioned inwardly of first interior holes 92.

In both the shipping configuration and the installed configuration, the center pole 52b is oriented with bushings 56 extending upwardly, perpendicular to the ground (when viewed from the front of breaker 50). The first interior holes 92 are aligned with center pole holes 98 (see FIG. 8) and bolts are secured therein. In this manner, center pole 52b is secured to support brackets 64a and 64b in both the shipping configuration and installed configuration.

With reference again to FIGS. 4 and 5, when in the installed configuration, poles 52a and 52c are positioned in second arced segment 80 of outer grooves 76. In this configuration, one of second interior holes 96 on flange 58 is aligned with pivot hole 88, and a bolt is received therein. Likewise, the end hole 90 on the outward facing side of flange 58 is aligned with longitudinally outer hole 86 and a bolt is secured therein. In this manner, each pole 52 is retained in the proper installed, operating position. It should further be appreciated that the center of gravity of each outer pole 52a and 52c (when viewed from the front) is outward of pivot hole 88.

Figure 10:
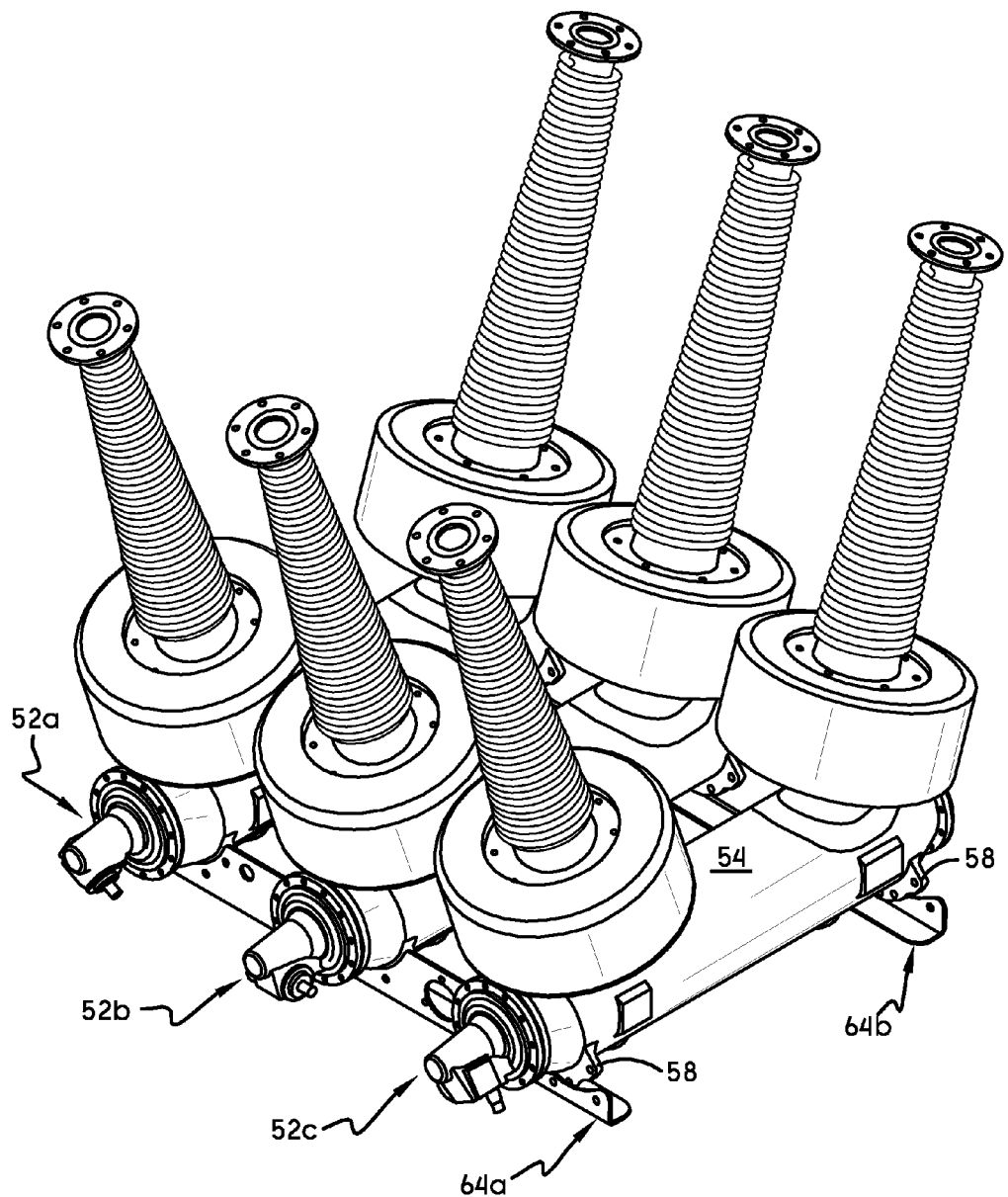
FIG. 10 is an isometric view of the pole and support bracket subassembly in the shipping configuration.
Figure 11:
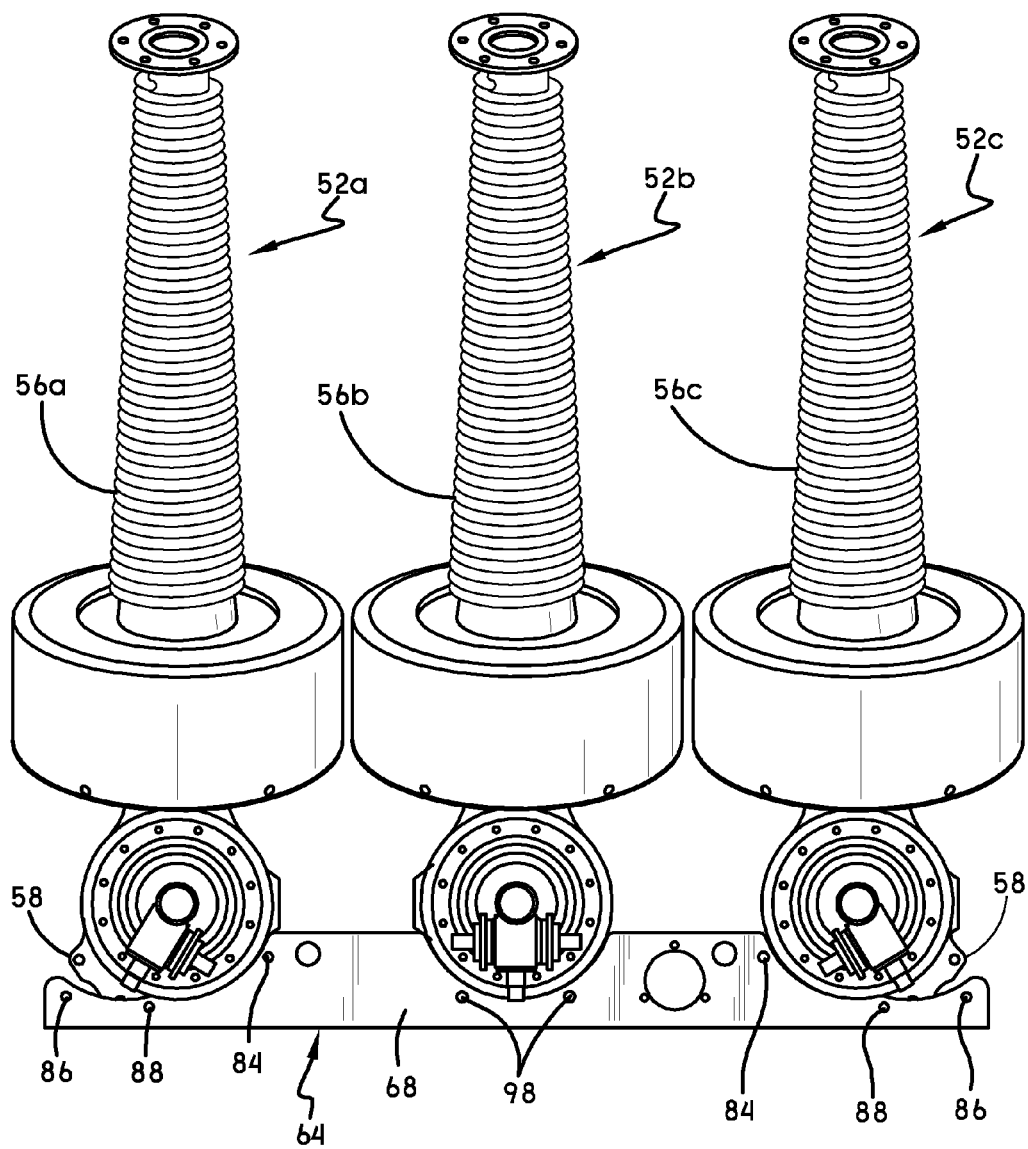
FIG. 11 is a front view of the pole and support bracket subassembly in the shipping configuration.

With reference now to FIGS. 10 and 11, poles 52 are shown in the shipping configuration. As can be seen, poles 52a and 52c are pivoted inwardly compared with the installed position. In this configuration, bushings 56 of poles 52 are parallel and extend generally perpendicular to ground (when viewed from the front). This configuration is achieved by pivoting poles 52a and 52c out of second arced segment 80 and into first arced segment 78. This is accomplished by removing the bolt located in end hole 90 and longitudinally outer hole 86. The bolt in second interior hole 96 and pivot hole 88 may be loosened but not removed. In a next step, the poles 52a and 52c are pivoted about pivot hole 88 until tank body 54 is received in first arced segment 78 and end hole 90 on the inward side of flange 58 is aligned with longitudinally inner hole 84. Thereafter a bolt is secured and tightened in the aligned holes 84 and 90. When in the shipping configuration it should be appreciated that the center of gravity (when viewing from the front), generally corresponds to axis 94 (see FIG. 7). Further, the center of gravity is now located inwardly of pivot hole 88. Thus, during movement between installed and shipping configuration, the center of gravity passes over pivot hole 88. In this manner, during movement between the two configurations, a large proportion of the weight of the pole 52 is carried by the bolts in the pivot hole 88.

According to one embodiment of the invention, breaker 50 is shipped in the following manner. One or more frames 63 may be disassembled and shipped in a single shipping container with one or more operating devices 60. In a second shipping container, the subassembly including the support brackets 64 and poles 52 are placed, with the subassembly being configured in the shipping configuration. Upon reaching the installation site, the linkages of the frame 59 are reassembled, the pole subassembly is mounted to the top, and the outer poles 52*a* and 52*c* are pivoted to the installed position. The operating device may then be operatively connected to the poles 52.

In the above described manner, the outer poles 52*a* and 52*c* are easily and safely movable between the installed and shipping configuration. The present invention enables safer and easier installation because less force is required to move the poles 52 when compared to prior art methods. Further, fewer parts are required (i.e. no requirement for shipping brackets) than prior art methods. Finally, the present invention minimizes the size of shipping containers, as all three bushings 56 extend upwardly the same distance when in the shipping configuration (see FIG. 11).

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A pole assembly for a three phase breaker, said pole assembly comprising:
    a center pole and a pair of outer poles positioned on opposed sides of said center pole, each said pole including a pair of outwardly extending bushings;
    a pair of brackets positioned at opposed ends of said center and said outer poles, said brackets each including a center groove and a pair of outer grooves positioned on opposed sides of said center groove, said center pole being positioned in said center groove, and each said outer pole being securable in said outer grooves in a shipping configuration and an installed configuration, wherein when in said shipping configuration said bushings of said center pole and said bushings of said outer poles are parallel, and when in said installed configuration said bushings of said outer poles are angled away from said bushings of said center pole; and
    wherein each said outer pole is pivoted about a pivot point disposed in the brackets between said shipping configuration and said installed configuration, said center of gravity of said outer pole being on a first side of said pivot point when in said shipping configuration and said center of gravity of said outer pole being on a second side of said pivot point, opposed from said first side when in said installed configuration.

2. The pole assembly according to claim 1 wherein said outer groove includes a first arced section and a second arced section, said first and second arced sections intersecting at an intersection point, said intersection point being proximate to said pivot point.

3. The pole assembly according to claim 2 wherein said outer poles are positioned in said first arced section when in said shipping configuration and said outer poles are positioned in said second arced section when in said installed configuration.

4. The pole assembly according to claim 1 wherein when in said shipping configuration, said bushings of said center pole and said outer poles extend upwardly to the same height.

5. A pole assembly for a three phase breaker, said pole assembly comprising:
    a center pole and a pair of outer poles positioned on opposed sides of said center pole, each said pole including a pair of outwardly extending bushings;
    a pair of brackets positioned at opposed ends of said center and said outer poles, said brackets each including a center groove and a pair of outer grooves, said outer grooves being positioned on opposed sides of said center groove, said center pole being positioned in said center groove and each said outer pole being securable in said outer groove in a shipping configuration and an installed configuration, wherein when in said shipping configuration said bushings of said center pole and said bushings of said outer poles are parallel, and when in said installed configuration said bushings of said outer poles are angled away from said bushings of said center pole; and
    wherein said outer groove includes a first arced section and a second arced section, said outer poles being positioned in said first arced section when in said shipping configuration and said outer poles being positioned in said second arced section when in said installed configuration.

6. The pole assembly according to claim 5 wherein said first and second arced sections intersect at an intersection point, and each said outer poles is pivotable about a pivot point between said shipping configuration and said installed configuration, said pivot point being proximate to said intersection point.

7. The pole assembly according to claim 5 wherein when in said shipping configuration, said bushings of said center pole and said outer poles extend upwardly to the same height.

\* \* \* \* \*